(No Model.)

L. WURZBURG.
JAR OR OTHER RECEPTACLE FOR PRESERVES, &c.

No. 602,791. Patented Apr. 19, 1898.

Witnesses.
Catherine T. Babcock
Florence H. Miller

Inventor
Ludwig Wurzburg
by Wm H Babcock
Attorney

THE NORRIS PETERS CO., PHOTO-LITHO., WASHINGTON, D. C.

UNITED STATES PATENT OFFICE.

LUDWIG WURZBURG, OF LONDON, ENGLAND.

JAR OR OTHER RECEPTACLE FOR PRESERVES, &c.

SPECIFICATION forming part of Letters Patent No. 602,791, dated April 19, 1898.

Application filed May 29, 1897. Serial No. 638,764. (No model.)

*To all whom it may concern:*

Be it known that I, LUDWIG WURZBURG, merchant, a subject of the Queen of England, and a resident of 4 Fenchurch Buildings, in the city of London, England, have invented new and useful Improvements in and Relating to Jars or other Receptacles for Preserves and the Like, of which the following is a specification.

My invention relates to jars or other receptacles for preserves and the like which are so made that they may be handled with facility, packed closely together in a case or box, and from which the preserves or other contents can be readily removed without breaking or destroying the entirety thereof. This latter feature is a decided advantage, especially when the jar is used for containing ox-tongue, lobster, or other flesh or fish meats or substances usually incased in a gelatinous envelop. By filling such substances into jars of the kind forming the suject of this invention the contents can be turned out whole ready for the table. A further advantage resulting from the use of jars or receptacles made according to my invention is that when empty and if so desired the jar or receptacle may be used as a drinking vessel or for other suitable purposes.

My invention furthermore relates to the air-tight closing of the jars or receptacles after sterilization of the contents in such a way that the cover or lid can be removed quickly and without damaging or breaking it or any other part. By this invention, therefore, glass or other brittle material may be advantageously used for the manufacture of the jars or receptacles and the covers or lids for same; but any other material of suitable rigidity may be used.

Figures 1, 2, 4:
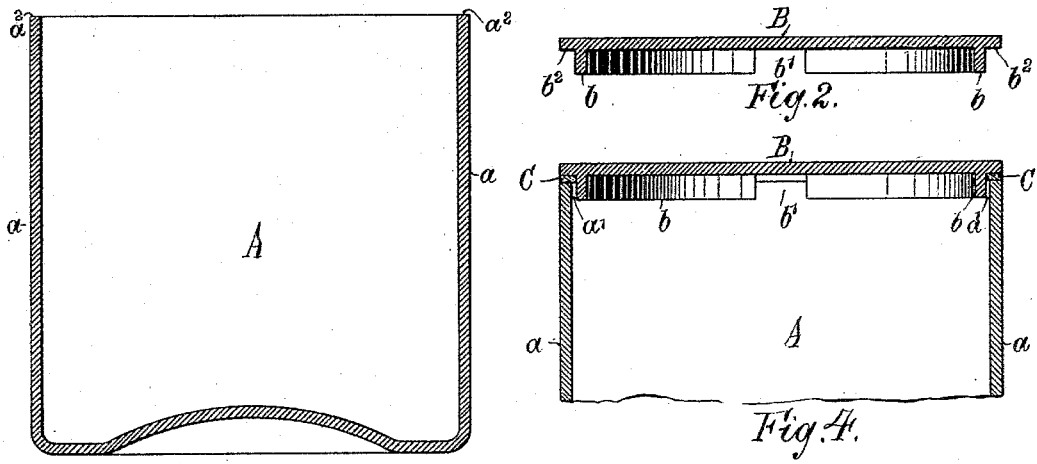
Figures 3, 5:
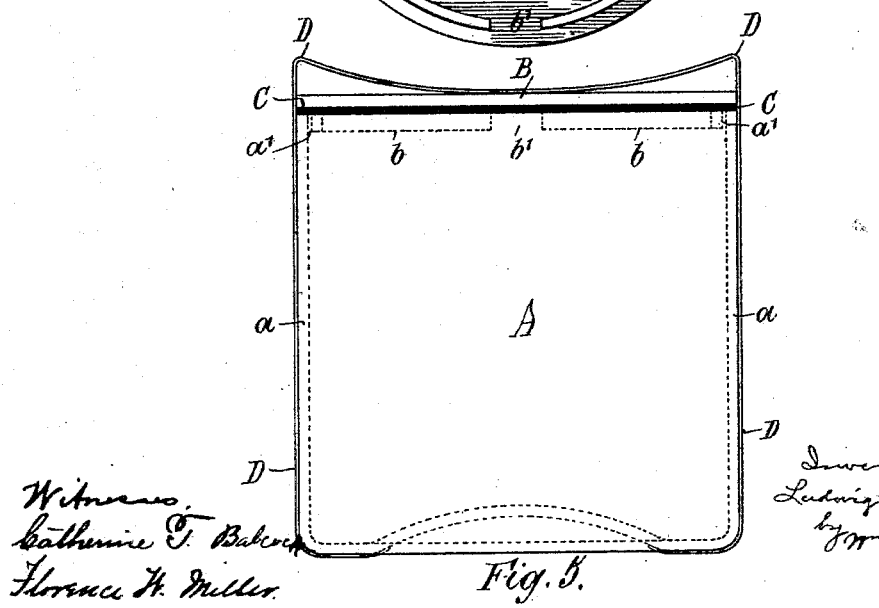

In the accompanying drawings, Figure 1 is a vertical section through a jar or receptacle made according to this invention, and Fig. 2 is a similar view of the cover or lid for use with said jar or receptacle. Fig. 3 is an inverted plan of the cover or lid. Fig. 4 is a sectional elevation of a portion of the jar and the cover, showing the same air-tightly closed thereon; and Fig. 5 is an elevation of the jar and cover and the closing-spring used therewith during the process of sterilization.

The same letters of reference, where they occur, are used to denote the same or corresponding parts in all the figures.

According to this invention the jar or receptacle A, as shown in Fig. 1, is made of a uniform internal and external diameter from top to bottom and smooth inside and outside and with a suitable base on which it may be stood upright. The cover or lid B, Figs. 2 and 3, is made in the form of a disk of such size as to be flush all round with the exterior walls $a$ of the jar or receptacle A when laid thereon. (See Figs. 4 and 5.) This disk cover or lid B is flat on the top surface and on the under surface is provided with a perpendicular wall or downwardly-projecting flange $b$, which extends almost completely round the disk, one part being interrupted or formed with a gate or way $b'$. The cover or lid is preferably provided with an external notch or other device to indicate the position of the gate or way $b'$. The flange $b$ is situated at such a position on the disk cover or lid B as to lie inside the exterior walls $a$ of the jar or receptacle A when laid thereon, leaving a small annular space $a'$ (see Figs. 4 and 5) between said flange $b$ and the walls $a$, so as just to allow room for the expansion of the contiguous parts of the glass or other material during the sterilization process. A rubber packing-ring C, of any suitable section, which is just large enough to lie without being stretched on the outside of the flange $b$ on the cover or lid B, is placed around and outside the said flange $b$ and forms a packing between the lower surface $b^2$ of the cover or lid B outside the flange and the flat top surface $a^2$ of the exterior walls $a$ of the jar or receptacle A.

During the process of sterilization of the contents the cover or lid B is held on by a spring-fastening, such as is shown at D in Fig. 5, pressing on the top of the cover or lid and taking under the base of the jar or receptacle A. This spring acts in the usual manner, the cover being slightly raised against the pressure of said spring under the action of the steam produced in the sterilization process, allowing the steam to escape from the interior of the jar. When the sterilization is completed, this spring-fastening D may be removed, the cover being held closed on the jar by the external atmospheric pressure thereon, the elastic packing-ring C forming a perfectly air-tight joint between the jar and its cover.

To open the jar, the rubber packing C is pressed inward, by the edge of a coin or other suitable device, through the gate or way $b'$ in the flange $b$ on the under surface of the disk cover B, thus allowing air to enter the interior of the jar through such gate or way $b'$, thereby destroying the partial vacuum inside the receptacle, whereupon the lid or cover can be lifted off.

It will be obvious that several modifications may be made in the cover without departing from the nature of the invention. For example, the cover need not necessarily be made flush with the outer walls of the jar or receptacle. The downward flange $b$ may have more than one interruption, if desired, and it may be inclined instead of being at right angles to the under surface of the cover, and the cover itself may be made of any suitable conformation other than a flat disk form. With a flat-top cover, however, such as is shown in Figs. 2 to 5, the jars or receptacles, when closed, can be handled with facility and will pack closely together in a case or box. It will furthermore be obvious that the cover and the method of closure hereinbefore described may be applied to receptacles having tapering bottle-necks.

What I claim as my invention, and desire to secure by Letters Patent, is—

1. In combination with a receptacle, a cap having an annular downward flange, fitting within the top of the same, and a compressible gasket interposed between the said parts, the said flange having a gate or way, $b'$, extending through the entire width of the flange and making communication with the interior of the can and the said space, in order that air may be admitted to the interior of the can when the gasket is displaced for the purpose set forth.

2. In combination with a receptacle, a cap having a flange that extends down into the latter, and a compressible gasket interposed between the under side of the said cap and the upper edge of the said receptacle, the said flange having a gate or way formed therein which makes communication with the interior of the can, in order that when the gasket is compressed air may be admitted to the interior of the can, substantially as, and for the purpose set forth.

LUDWIG WURZBURG.

Witnesses:
H. F. BURTON,
M. O'TOOLE.